United States Patent
Kuhm

(10) Patent No.: US 9,328,756 B2
(45) Date of Patent: May 3, 2016

(54) FIXING DEVICE FOR CABLES

(71) Applicant: TRW Automotive Electronics & Components GmbH, Radolfzell (DE)

(72) Inventor: Michel Kuhm, Ingwiller (FR)

(73) Assignee: TRW Automotive Electronics & Components GmbH (DE)

( * ) Notice: Subject to any disclaimer, the term of this patent is extended or adjusted under 35 U.S.C. 154(b) by 0 days.

(21) Appl. No.: 14/551,111

(22) Filed: Nov. 24, 2014

(65) Prior Publication Data

US 2015/0159778 A1 Jun. 11, 2015

(30) Foreign Application Priority Data

Dec. 9, 2013 (FR) .................................... 13 62277

(51) Int. Cl.
| | |
|---|---|
| *H02G 3/30* | (2006.01) |
| *F16B 2/20* | (2006.01) |
| *F16B 9/02* | (2006.01) |
| *H02G 3/32* | (2006.01) |
| *B60R 16/02* | (2006.01) |
| *F16B 2/22* | (2006.01) |
| *F16B 2/24* | (2006.01) |

(52) U.S. Cl.
CPC ............. *F16B 9/023* (2013.01); *B60R 16/0215* (2013.01); *H02G 3/32* (2013.01); *F16B 2/22* (2013.01); *F16B 2/245* (2013.01)

(58) Field of Classification Search
CPC ............. H02G 3/32; H02G 3/02; H02G 3/30; B60R 16/0215; F16L 3/1091; F16L 3/13; F16L 3/233; E04B 9/242

USPC ................. 248/74.1, 74.2, 316.7, 57, 65, 73; 24/16 PB, 16 R, 545, 555, 543

See application file for complete search history.

(56) References Cited

U.S. PATENT DOCUMENTS

| | | | | |
|---|---|---|---|---|
| 3,944,177 | A | * | 3/1976 | Yoda .............................. 248/74.2 |
| 3,980,263 | A | * | 9/1976 | Okuda ............................. 248/73 |
| 4,917,340 | A | * | 4/1990 | Juemann et al. .............. 248/74.2 |
| 5,050,824 | A | * | 9/1991 | Hubbard .......................... 248/57 |
| 6,220,554 | B1 | * | 4/2001 | Daoud .......................... 248/74.1 |
| 7,240,880 | B2 | * | 7/2007 | Benoit et al. ..................... 248/65 |
| 8,757,562 | B2 | * | 6/2014 | Fujiwara ...................... 248/74.2 |
| 2008/0229550 | A1 | | 9/2008 | Elsner |
| 2009/0236486 | A1 | * | 9/2009 | Matsuno et al. ............ 248/316.7 |
| 2012/0124782 | A1 | | 5/2012 | Elsner et al. |

FOREIGN PATENT DOCUMENTS

| | | |
|---|---|---|
| DE | 202007000938 | 5/2007 |
| DE | 102008059360 | 6/2010 |
| FR | 2955711 | 7/2011 |
| JP | 10331814 | 12/1998 |
| JP | 2002067830 | 3/2002 |
| JP | 2008259363 | 10/2008 |

\* cited by examiner

*Primary Examiner* — Tan Le
(74) *Attorney, Agent, or Firm* — Tarolli, Sundheim, Covell & Tummino LLP

(57) ABSTRACT

A fixing device for cables has at least an edge clip part for mounting the fixing device on an edge of a base part. The edge clip part includes a plug-on gap into which the edge is introduced when plugging the edge clip part onto the edge. At least one protective tab is provided which is articulated to a boundary wall of the plug-on gap and extends towards an opposed boundary wall of the plug-on gap. A recess for the protective tab is provided on the opposed boundary wall of the plug-on gap, into which the tip of the protective tab partly engages in the unloaded condition of the edge clip part.

15 Claims, 3 Drawing Sheets

FIXING DEVICE FOR CABLES

BACKGROUND OF THE INVENTION

The present invention relates to a fixing device for cables.

In particular in the automotive industry different fixing devices are known, with which individual cables or cable harnesses can be fixed e.g. at a sheet-metal part.

In one type of fixing device the same is put or clamped onto a protruding sheet-metal fold at the vehicle, a sheet-metal edge. These fixing devices include e.g. cable straps or other holding means, by means of which the cables can be fixed and guided.

From DE 20 2007 000 938 U1 there is already known a fixing device for cables, which can be mounted onto an edge and which includes a cable tie lock with a cable strap to be introduced into the cable tie lock.

DE 10 2008 059 360 A1 likewise discloses a fixing device which can be mounted onto an edge. The fixing device includes a holding device for simultaneously fixing several cable straps.

What has turned out to be problematic with the fixing devices for cables known so far is the fact that during the assembly of the fixing devices, cables can get info the plug-on gap of the fixing device. This leads to the fact that the cables must again be removed from the plug-on gap, before the fixing device is mounted onto the edge. But since barbs are arranged inside the plug-on gap, by means of which the fixing device gets caught on the sheet-metal fold, the cables can be damaged thereby.

Therefore, it is the object of the invention to develop a fixing device for cables in an advantageous way, in particular to the effect that the risk of a damage of the cables before mounting the fixing device at the sheet-metal fold is reduced.

BRIEF DESCRIPTION OF THE INVENTION

The above object is achieved by means of a fixing device for cables has at least an edge clip part for mounting the fixing device on an edge of a base part. The edge clip part includes a plug-on gap into which the edge is introduced when plugging the edge clip part onto the edge. At least one protective tab is provided which is articulated to a boundary wall of the plug-on gap and extends towards an opposed boundary wall of the plug-on gap. A recess for the protective tab is provided on the opposed boundary wall of the plug-on gap, into which the tip of the protective tab partly engages in the unloaded condition of the edge clip part.

The protective tab can be pushed into the plug-on gap, so that it does not impede the plugging of the fixing device onto the sheet-metal fold. In the unmounted condition, the at least one protective tab however easily and reliably prevents an intrusion of cables into the plug-on gap. The recess prevents that the protective tab is laterally shifted, whereby it would no longer rest on the opposed side and might slip info the plug-on gap.

Preferably, at least two protective tabs can be provided. An intrusion of cables into the plug-on gap thereby can be prevented even better.

Advantageously, it is conceivable that one protective tab each is arranged at one end each of the plug-on gap. Since a cable usually intrudes into the plug-on gap at the ends of the same, such arrangement prevents cables from intruding already right from the start. The arrangement of the protective tabs at the ends of the plug-on gap also is favorable in terms of manufacture, because the protective tabs can be formed and integrally molded more easily at the ends of the plug-on gap.

Furthermore, it can be provided that a first protective tab is arranged on the one boundary wall of the plug-on gap and that a second protective tab is arranged on the opposed boundary wall of the plug-on gap. This diagonal arrangement, i.e. the arrangement of a protective tab on the one boundary wall of the plug-on gap and the arrangement of a second protective tab on the other side of the plug-on gap on the opposed boundary wall of the plug-on gap, makes it more difficult for example for a cable to intrude into the plug-on gap past the protective tabs.

In addition, it is possible that a metal part is inserted in the edge clip part which reinforces the edge clip part.

The metal part can be L-shaped. In this case, only one side wall of the edge clip part can be reinforced by the metal part.

It is, however, also conceivable that the metal part is formed U-shaped. By reinforcing the edge clip part with the metal part, the clamping effect and durability of the fixing device can be improved.

Furthermore, it is conceivable that the metal part is a bendable clip or a spring sheet which partly constricts the opening of the edge clip part, when the edge is not inserted into the edge clip part.

The metal part can have a pretension and contracts the plug-on gap. The plug-on gap is closed by the protective tabs and is pushed apart by inserting the edge. This provides the advantage that the fixing device is clampingly retained at the edge. In addition, the protective tab advantageously is pushed against the opposed boundary wall of the plug-on gap, which likewise makes an intrusion of a cable into the plug-on gap more difficult or prevents the same.

In one possible embodiment the metal part can include at least one holding tongue which protrudes into the plug-on gap and rests against the edge when the fixing device is mounted. It is also conceivable that the metal part includes holding tongues for the edge on both sides of the plug-on gap, so that holding tongues rest on both sides of the edge.

It is also possible that after mounting the edge clip part onto the edge, the protective tabs and the holding tongues do not lie one above the other. The protective tab or the protective tabs and the holding tongue or the holding tongues can be arranged such that they each rest on another region of the edges. This does not impair the holding force of the holding tongues.

In particular, it can be provided that the holding tongues are arranged in a region in the plug-on gap which the protective tabs cannot reach when they are pushed into the plug-on gap. This region preferably lies below the tips of the protective tabs, when the protective tabs are pushed into the plug-on gap.

The recess is rounded, for example.

It is particularly advantageous when the tip of the protective tab likewise is rounded.

The protective tab can at least partly be bent into the plug-on gap. This facilitates mounting of the edge clip part onto the edge.

BRIEF DESCRIPTION OF THE DRAWINGS

Further features and advantages of the invention can be taken from the following description and from the following drawings to which reference is made. In the drawings.

DETAILED DESCRIPTION OF THE INVENTION

Figure 1:
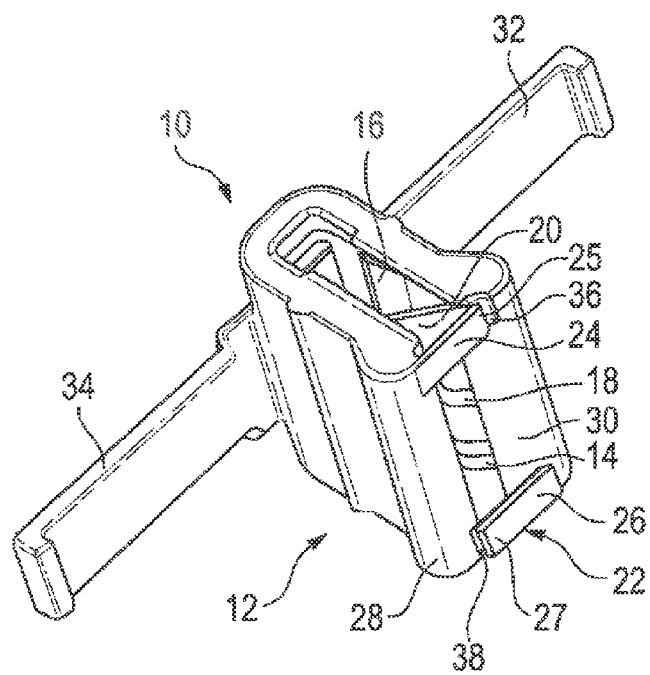
FIG. 1 shows an exemplary embodiment of a fixing device according to the invention in a perspective representation.

FIG. 1 shows a perspective view of an exemplary embodiment of a fixing device 10 for cables according to the invention.

The fixing device 10 includes an edge clip part 12 for mounting the fixing device 10 on a non-illustrated edge of a base part, in particular a sheet-metal fold.

The edge clip part 12 includes an opening 14 with which the edge clip part 12 is mounted onto the edge. The opening 14 has a U-shaped cross-section and includes two side faces 16 and a plug-on gap 18.

On the two outer ends 20 and 22 of the plug-on gap 18 a protective tab 24 and 26 each is provided.

The protective tabs 24 and 26 each are articulated to a boundary wall 23, 30 of the plug-on gap 18 and each extend towards the opposed boundary wall 30, 28 of the plug-on gap 18.

The first protective tab 24 is arranged on the one boundary wall 28 of the plug-on gap 18 and the second protective tab 26 is arranged on the opposed boundary wall 30 of the plug-on gap 18. Consequently, the protective tabs 24 and 26 are arranged diagonally to each other.

The fixing device 10 includes two fixing wings 32, 34 at the end at which the base of the opening 14 is located.

On the opposed boundary wall 28, 30 of the plug-on gap 18 a recess 36, 38 each is provided for each of the protective tabs 24 and 26, into which the tip 25, 27 of the protective tabs 24 and 26 partly engages in the unloaded condition of the edge clip part 12.

Figure 2:
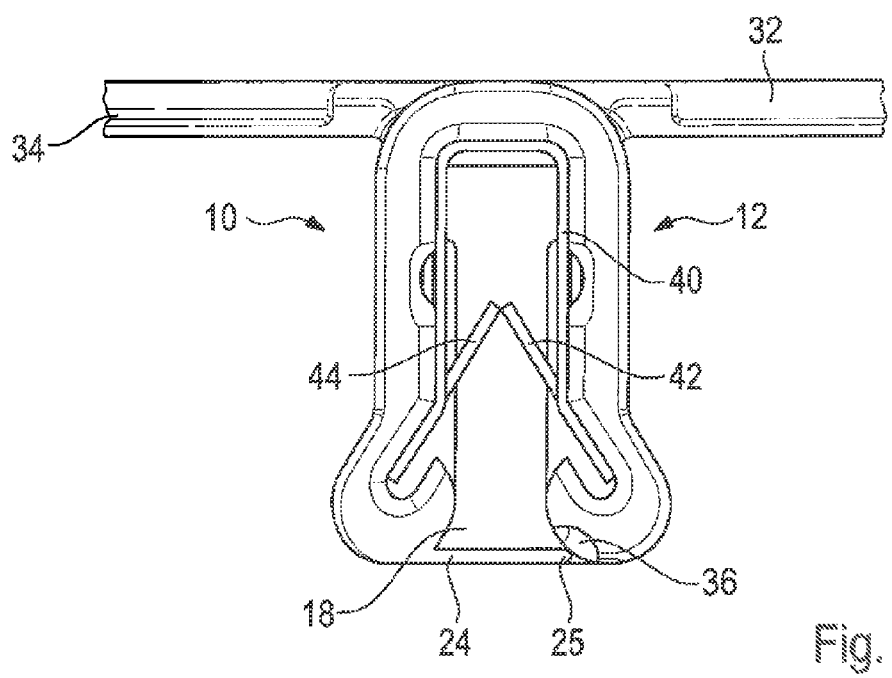
FIG. 2 shows a lateral sectional representation of the fixing device according to FIG. 1.

FIG. 2 shows a sectional representation of the fixing device according to FIG. 1. In the edge clip part 12 a metal part 40 is inserted, which reinforces the edge clip part 12.

The metal part 40 is a spring sheet which partly constricts the plug-on gap 18 of the edge clip pad 12, when the edge is not inserted into the edge clip part 12.

The metal part 40 furthermore includes two holding tongues 42, 44 which are arranged opposite each other. The holding tongues 42, 44 protrude into the plug-on gap 18.

The protective tabs 24, 26 and the holding tongues 42, 44 are arranged such that they each rest in another region of the edge K.

The assembly and function of the fixing device 10 will be described below:

The fixing device 10 is mounted onto the edge K with the plug-on gap 16.

By mounting the fixing device 10, the protective tabs 24 and 26 are pushed into the plug-on gap 16.

Figure 3:
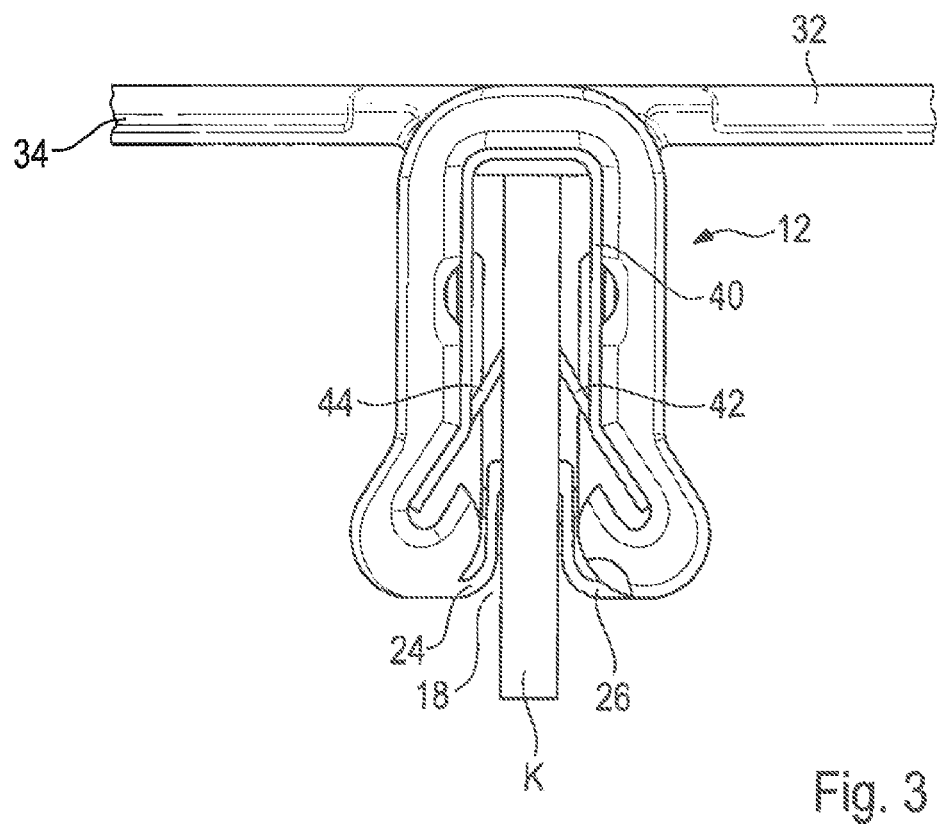
FIG. 3 shows a lateral sectional representation of the fixing device according to FIG. 1 with inserted edge.

As shown in FIG. 3, the holding tongues 42, 44 rest against the edge K, when the fixing device 10 is mounted. The fixing device 10 thereby is jammed with the edge K.

After mounting the edge clip part 12 onto the edge K, the protective tabs 24, 26 and the holding tongues 42, 44 do not lie one above the other.

Due to the fact that the protective tabs 24, 26 and the holding tongues 42, 44 are arranged such that they each rest in another region of the edge K, the holding force of the holding tongues 42, 44 is not impaired. It thereby is ensured that the holding tongues 42, 44 directly rest against the sheet-metal fold K and the protective tabs 24, 26 cannot move between the holding tongues 42, 44 and the sheet-metal fold K.

The holding tongues only are arranged in a region in the plug-on gap 16 which the protective tabs 24, 26 cannot reach, when they are pushed into the plug-on gap.

By means of the fixing wings 32, 34 cable strands or lines can be guided or fixed.

The fixation of the cables usually is effected after mounting the fixing device 10 onto the edge K. Even if the cables meet with the fixing device, before the same is mounted onto the sheet-metal fold, they cannot get into the plug-on gap, since the protective tabs cover the same as long as the fixing device is not mounted onto the sheet-metal fold.

Figure 4:
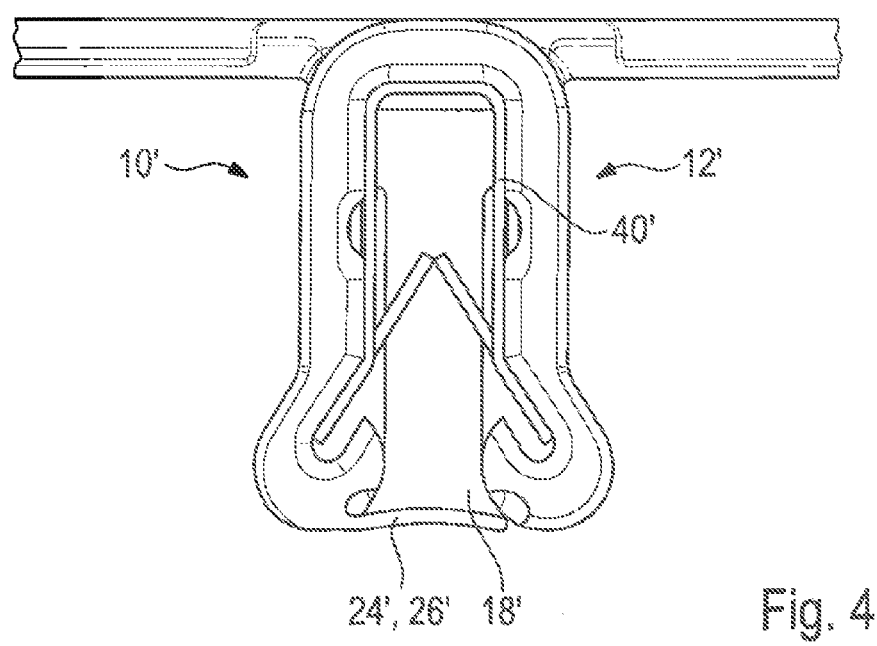
FIG. 4 shows a second exemplary embodiment of a fixing device according to the invention.

FIG. 4 shows another embodiment of the fixing device of the present invention.

The shown fixing device 10' substantially is identical with the fixing device 10 according to FIGS. 1 and 2 and substantially has the same features and advantages.

In the edge clip part 12' there is also inserted a metal part 40' which reinforces the edge clip part 12'.

The fixing device 10' only differs from the fixing device 10 according to FIGS. 1 to 3 in that the protective tabs 24', 26' are at least partly bent in a direction into the plug-on gap 16'.

This facilitates mounting of the edge clip part 12' of the fixing device 10' onto the edge.

Figure 5:
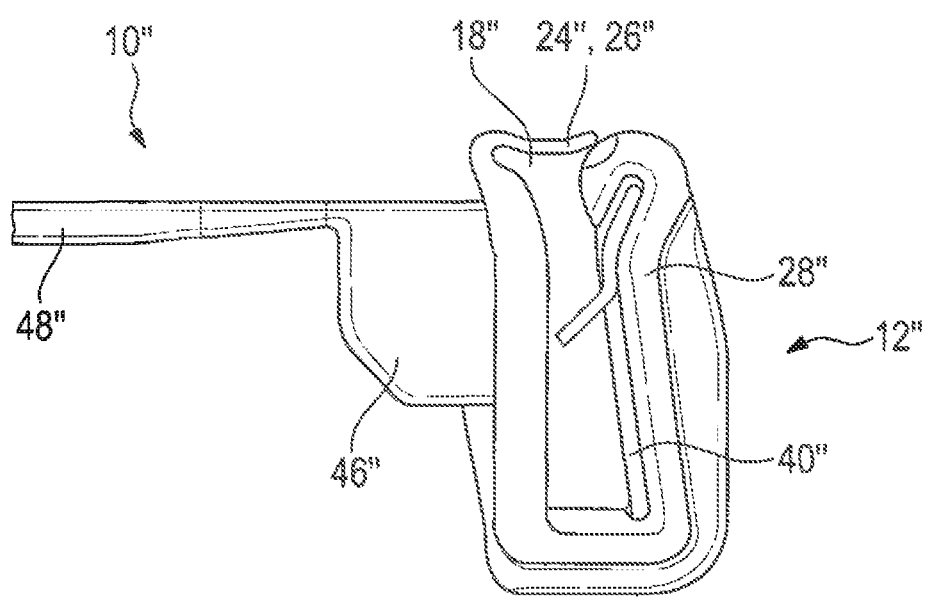
FIG. 5 shows a third exemplary embodiment of a fixing device according to the invention.

FIG. 5 also shows another embodiment of the fixing device of the present invention.

The fixing device W according to the invention as shown in FIG. 5 substantially has the same features and advantages of the two aforementioned exemplary embodiments of the fixing device 10, 10' according to FIGS. 1 to 4.

At each of the two ends of the plug-on gap 16" there are likewise provided protective tabs 24", 26", which like in the exemplary embodiment of FIG. 4 are at least partly bent in a direction towards the plug-on gap 16".

One difference however consists in that the metal part 40" inserted into the edge clip part 12" is formed L-shaped. Consequently, only the one boundary wall 23" is reinforced with the metal part 40".

On the side facing away from the metal part 40", there is provided a cable tie lock 46" with a cable strap 46" to be introduced into the cable tie lock 46".

The invention claimed is:

1. A fixing device for cables with at least an edge clip part for mounting said fixing device on an edge of a base part, wherein said edge clip part includes a plug-on gap into which an edge is introduced when plugging said edge clip part onto said edge, wherein at least one protective tab is provided, said protective tab being articulated to a boundary wall of said plug-on gap and extending towards an opposed boundary wall of said plug-on gap, a recess for said protective tab being provided on an opposed boundary wall of said plug-on gap, into which a tip of said protective tab partly engages in an unloaded condition of said edge clip part.

2. The fixing device of claim 1 wherein at least two of said protective tabs are provided.

3. The fixing device of claim 1 wherein one each of said protective tabs is arranged at each of said ends of said plug-on gap.

4. The fixing device of claim 2 wherein a first protective tab is arranged on one of said boundary walls of said plug-on gap and that a second protective tab is arranged on an opposed of said boundary walls of said plug-on gap.

5. The fixing device of claim 1 wherein a metal part is inserted into said edge clip part, said a metal part reinforcing said edge clip part.

6. The fixing device of claim 5 wherein said metal part is a bendable clip or a spring sheet which partly constricts said plug-on gap of said edge clip part when said edge is not inserted into said edge clip part.

7. The fixing device of claim 6 wherein said metal part includes at least one holding tongue which protrudes into said plug-on gap and rests against said edge when said fixing device is mounted.

8. The fixing device of claim 7 wherein said protective tab and said holding tongue do not lie one above the other after mounting said edge clip part onto said edge.

9. The fixing device of claim 1 wherein said protective tab is at least partly bent towards said plug-on gap.

10. A fixing device for cables comprising:
    an edge clip part configured to mount the fixing device on an edge of a base part, the edge clip part including a plug-on gap into which the edge of the base part is inserted when the fixing device is mounted, the plug-on gap including substantially parallel first and second boundary walls;
    a protective tab articulatably extending from the first boundary wall, the protective tab extending transverse to the first and second boundary walls and toward the second boundary wall;
    a recess on the second boundary wall, a tip of the protective tab engaging the secondary boundary wall in the recess when the edge clip part is in an unloaded condition; and
    fixing wings configured to fix the cables to the fixing device, the fixing wings extending away from the plug-on gap.

11. The fixing device of claim 10, further including a metal part for reinforcing the edge clip part inserted into the edge clip part.

12. The fixing device of claim 11, wherein the metal part is a spring sheet that partly obstructs the plug-on gap of the edge clip part when the plug-on gap is free from the edge of the base part.

13. The fixing device of claim 12, wherein the metal part includes a holding tongue that protrudes into the plug-on gap and rests against the edge of the base part when the edge of the base part is inserted into the plug-on gap.

14. The fixing device of claim 13, wherein the protective tab is offset from the holding tongue when the edge of the base part is inserted into the plug-on gap.

15. The fixing device of claim 10, wherein the protective tab is at least partly bent toward the plug-on gap.

* * * * *